United States Patent [19]

Lundberg

[11] Patent Number: 5,738,527

[45] Date of Patent: Apr. 14, 1998

[54] SCREEN SAVER

[76] Inventor: Steven W. Lundberg, 4611 Wooddale, Edina, Minn. 55424

[21] Appl. No.: 694,154

[22] Filed: Aug. 8, 1996

[51] Int. Cl.⁶ ............................... G09B 3/00; G09B 7/00
[52] U.S. Cl. ............................... 434/322; 434/323
[58] Field of Search ............................... 395/173, 522; 345/473, 522; 434/322, 323

[56] References Cited

U.S. PATENT DOCUMENTS

| | | | |
|---|---|---|---|
| 5,180,309 | 1/1993 | Egnor | 434/323 |
| 5,387,104 | 2/1995 | Corder | 434/156 |
| 5,498,002 | 3/1996 | Gechter | 273/434 |
| 5,680,535 | 10/1997 | Harbin et al. | 345/473 |

*Primary Examiner*—Richard J. Apley
*Assistant Examiner*—John Edmund Rovnak
*Attorney, Agent, or Firm*—Schwegman, Lundberg, Woessner & Kluth, P.A.

[57] ABSTRACT

A screen saver provides that questions and answers are displayed to a user while in a foreground screen saver mode. Scores may be kept track of, and users may customize the database, or select different sets of data to use.

4 Claims, 10 Drawing Sheets

5,738,527

SCREEN SAVER

TECHNICAL FIELD OF THE INVENTION

The present invention relates to screen savers, and more particularly to educational screen savers.

BACKGROUND OF THE INVENTION

Screen savers are now in widespread use to prevent the premature degradation of CRT or liquid crystal displays as can occur if the same image remains displayed for too long, as is well known in the art. Screen savers operate in a background mode monitoring the input to the system, and once a predetermined time has elapsed since the last input (from a keyboard or mouse for example) switch to a foreground mode in which they continuously alter the screen display so that it "saves" the screen, and may additionally function to hide or obscure what the user has displayed on his or her computer.

The present invention provides an educational screen saver software package.

SUMMARY OF THE INVENTION

The present invention provides a customizable screen saver program that can display information or questions and answers and score the user's performance. When the program goes into the screen saver mode a question (or information) is displayed from a set of questions (or units of information). Preferably, the screen display is persistently altered in a manner sufficient to "save" the display, while at the same time display the question or information in a manner that can be read by a user at least from time to time while the screen saver mode is active, or just before displaying an answer and/or returning to background mode. When an input is received, the screen saver program can either display the answer to the question for a short time and then return to the system as it existed prior to the start of the screen saver mode, or request and receive an answer to the question and if desired record and/or score the answer as right or wrong. The screen saver software also preferably allows the user to create his or her own custom database of questions and answers, or units of information for display.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
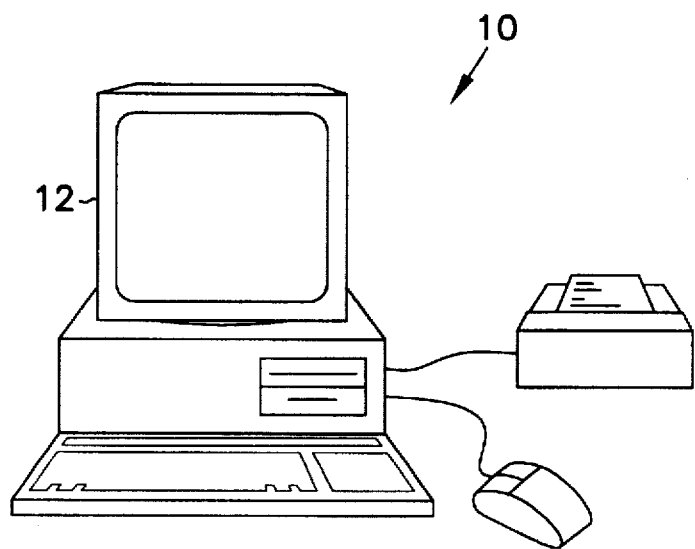
FIG. 1 shows a personal computer or workstation.

FIG. 1 illustrates a personal computer (for example IBM or Macintosh compatible) or workstation system 10 (for example a SUN or Silicon Graphics model), on which the screen saver program of the present invention can be used. System 10 preferably includes a display (CRT or flat panel), keyboard, mouse input device, and optionally a printer.

Figure 2:
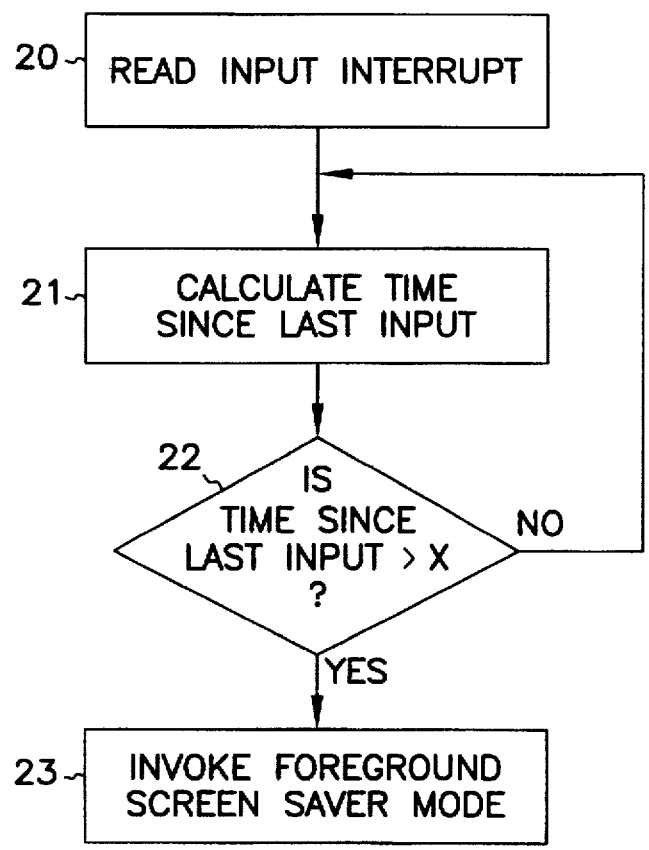
FIGS. 2, 3, and 4 show various flow diagrams of the software of the present invention.

FIG. 2 shows the operation of the screen saver program in background mode, in which it monitors input activity (20, 21, 22) and invokes (23) the foreground screen saver mode when a predetermined and preferably adjustable time of "x" seconds has elapsed since the last input was received from a user, as is conventionally known in the art. The screen saver program is preferably distributed in an object code form.

Figure 3:
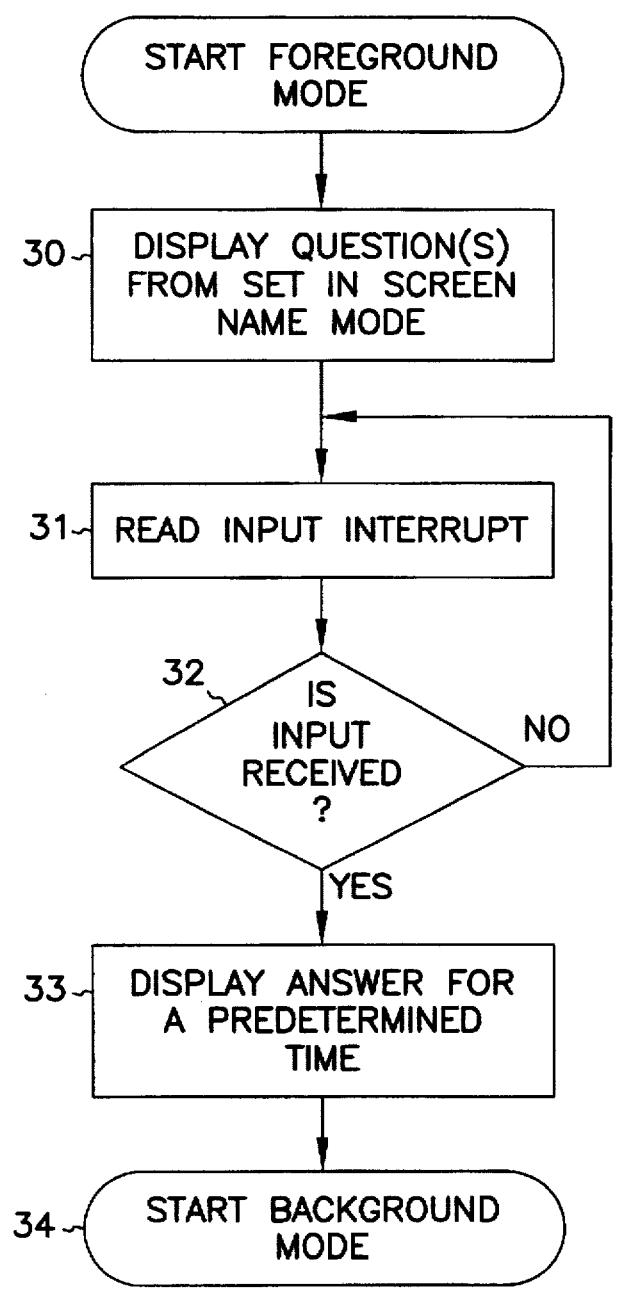

FIG. 3 illustrates the operation of the screen saver program in one exemplary foreground mode. A question from a database containing questions and corresponding answers is displayed (30). Once an input is received (for example from a mouse device or keyboard) indicating the user wishes to return to use of the system 10 (31, 32), the screen saver displays (33) the answer to the question for a predetermined time, and then returns to background mode (34). Preferably, while displaying the question the screen display is continuously altered in a manner to "save" the screen, by any known technique, but preferably so that the question can be read by a user while the screen is altered, or at least from time to time while the alterations are ongoing, or right after the user input is first detected when the screen saver is in the foreground mode. The second user input would then trigger the display of the answer.

Figure 4:
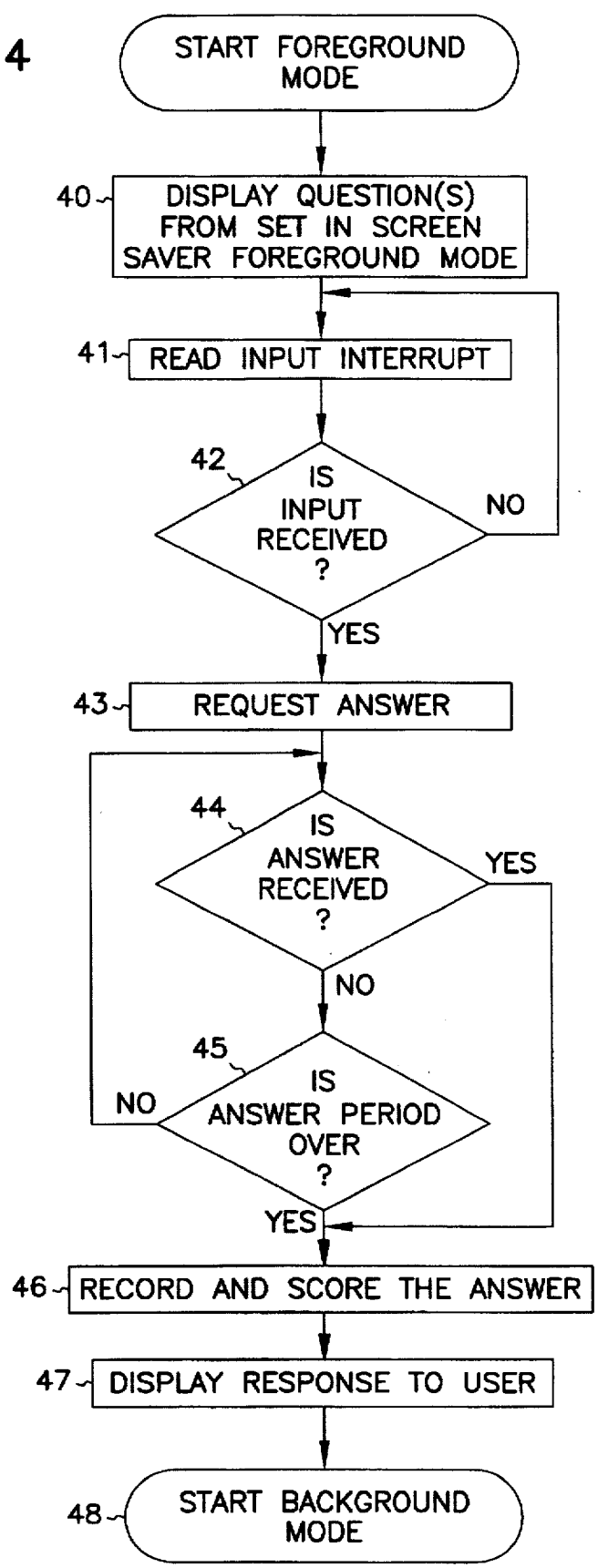

FIG. 4 illustrates yet another exemplary embodiment in which instead of immediately displaying the answer, the screen saver program requests the user to input an answer (43), either using the keyboard or the mouse. The saver waits to receive an answer (44), during a predetermined answer period (45), at the end of which, or if the answer is input, the saver records the answer (46) and, optionally, scores it right or wrong, and, optionally, displays a response to the user such as that the answer was right or wrong, or optionally what the correct answer is (47). The screen saver program thereafter returns to background mode (48).

In one such embodiment, the screen-saver program, after requesting the user to input an answer, will not release the system for further use until the user inputs an answer (whether right or wrong). Once an answer has been entered (i.e. return to background mode), the screen saver program scores it right or wrong, and updates a saved overall score of right versus wrong answers that is saved in storage. In this way, a user is forced to answer questions and their overall right-and-wrong score is maintained. In another such embodiment, a user's score is kept on a question-by-question basis. In this way, questions which were answered incorrectly can be presented again (or more frequently), while questions which were answered correctly can be skipped in the future (or presented less frequently). Thus a learning environment is promoted, and a user eventually "graduates" from a set of questions by answering a predetermined number or percentage of the questions correctly.

In another embodiment, the screen-saver program, while in the foreground mode, continuously displays questions followed by corresponding answers, each from the database containing questions and corresponding answers. For example, the a question for a suitable amount of time (for example, enough time for carefully reading the question plus some time to contemplate an answer, e.g., between three seconds and 3 minutes), then an answer to that question for a suitable amount of time, then another question, followed by an answer to that question.

Figure 5:
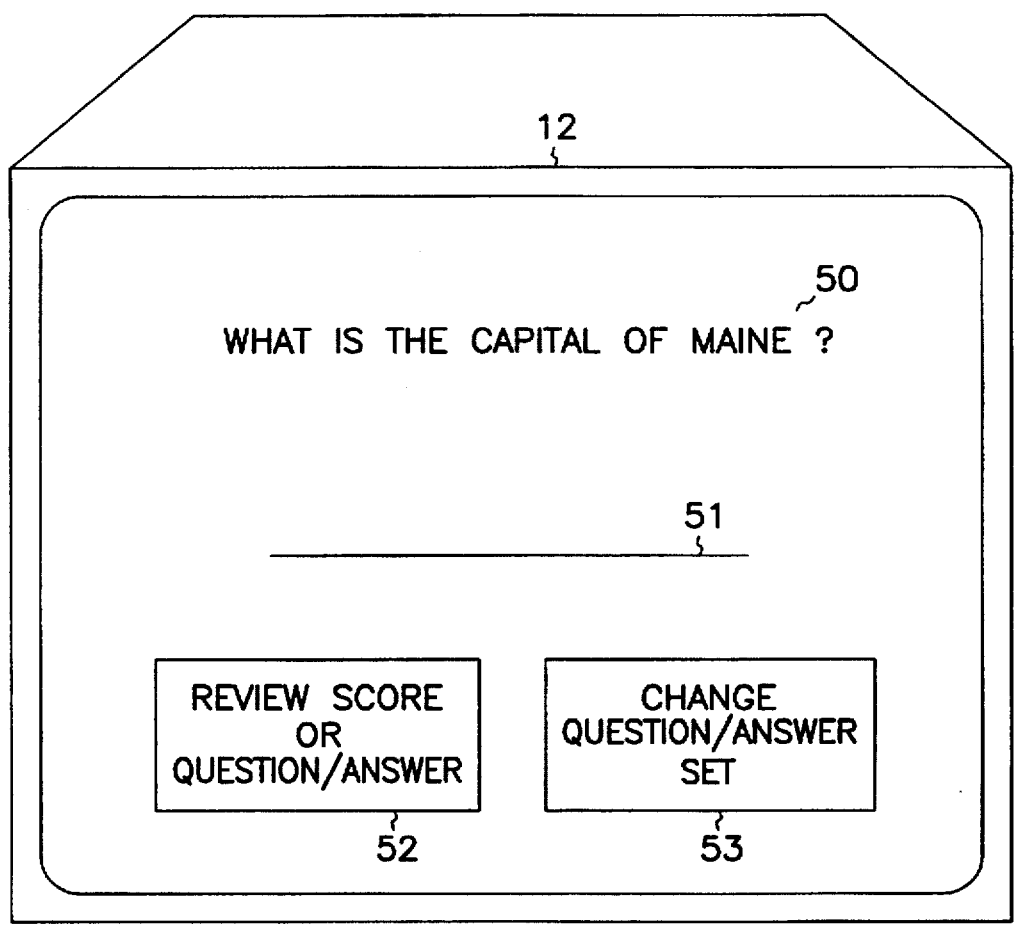
FIG. 5 is a sample display.

FIG. 5 illustrates one exemplary display of the screen saver program while it is in the foreground mode. A question (50) is displayed, along with two "buttons" which can be selected by a user with the mouse. A space (51) is provided on the display for the user to type in an answer. Alternatively, the answer could be selected by picking from answers displayed on the screen, using the mouse or other input means. Button 52 invokes the score or question/answer review mode in which the user can review their score of the number of correctly answered questions, or can review the questions and/or answers. Button 53 invokes a database change or creation mode (FIGS. 7A and 7B).

Figure 6:
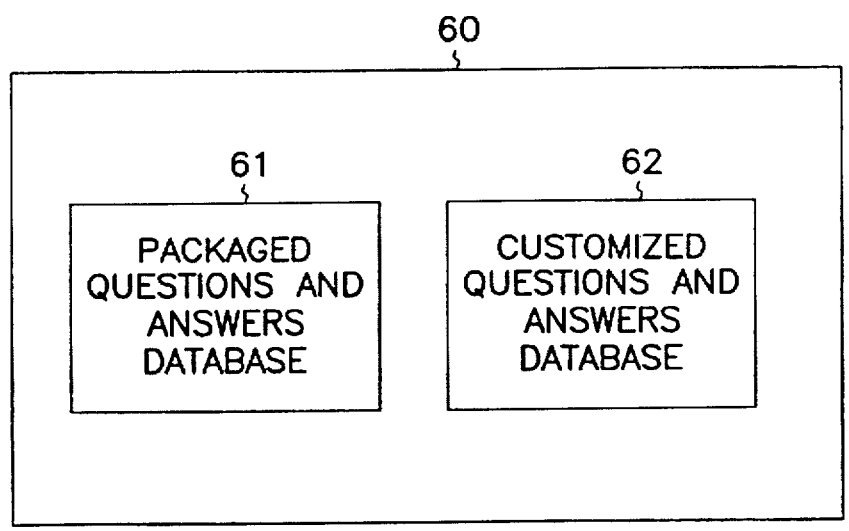
FIG. 6 shows the databases to be used with the software.

FIG. 6 illustrates that the screen saver program of the present invention preferably includes a set of "packaged" questions and corresponding answers, that are provided with the program, or sold or supplied separately to users of the program. In one embodiment, database 60 is a data structure, having one or more fields for questions, one or more fields for corresponding answers, and optionally other fields (e.g., time values (overall or corresponding to each question and/or answer), and score values (overall or corresponding to each question and/or answer)). A custom database (61) can be created by the user using the screen saver program. In one embodiment, database 60 and database 61 each include a set of textual questions, and a set of corresponding textual answers. In another embodiment, the questions and answers are compressed, and a compressed value corresponding to each textual question and answer is stored in databases 60 and 61. In yet another embodiment, a single value corresponding to the time which each question is displayed is also kept in database 60 or database 61. In yet another embodiment, a value corresponding to the time which each answer is displayed is also kept in database 60 or database 61. In still yet another embodiment, a separate value for each question corresponding to the time which its corresponding question is to be displayed is also kept in database 60 or database 61. In this way long or complex questions can be accorded a longer display time. In yet another embodiment, a separate value for each answer corresponding to the time which its corresponding answer is displayed is also kept in database 60 or database 61. In this way long or complex answers can be accorded a longer display time.

Figures 7A, 7B:
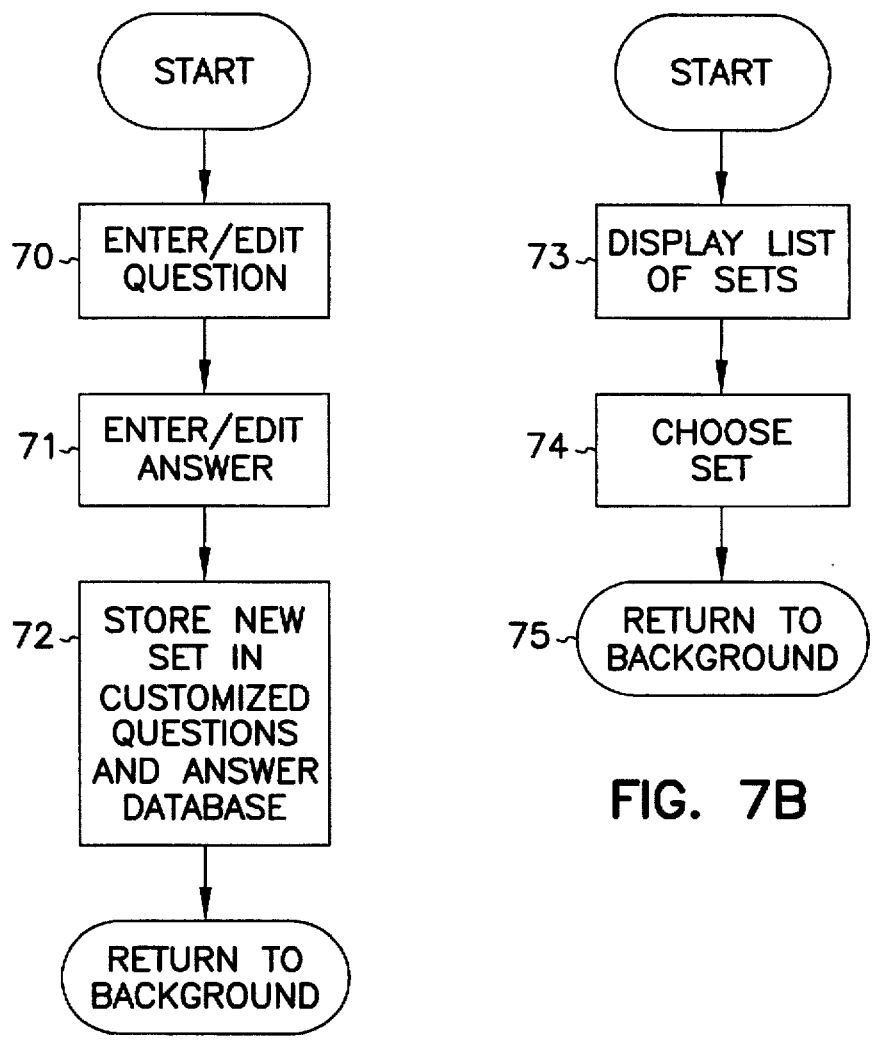
FIGS. 7A and 7B illustrate the flow of the program to modify or create custom databases, or change databases.

FIGS. 7A and 7B illustrate the changing of a question and answer (or information unit) set in a foreground mode of the program as invoked by button 53 (73–75), or creation of a new set of questions and answers (70–72).

Figure 8:
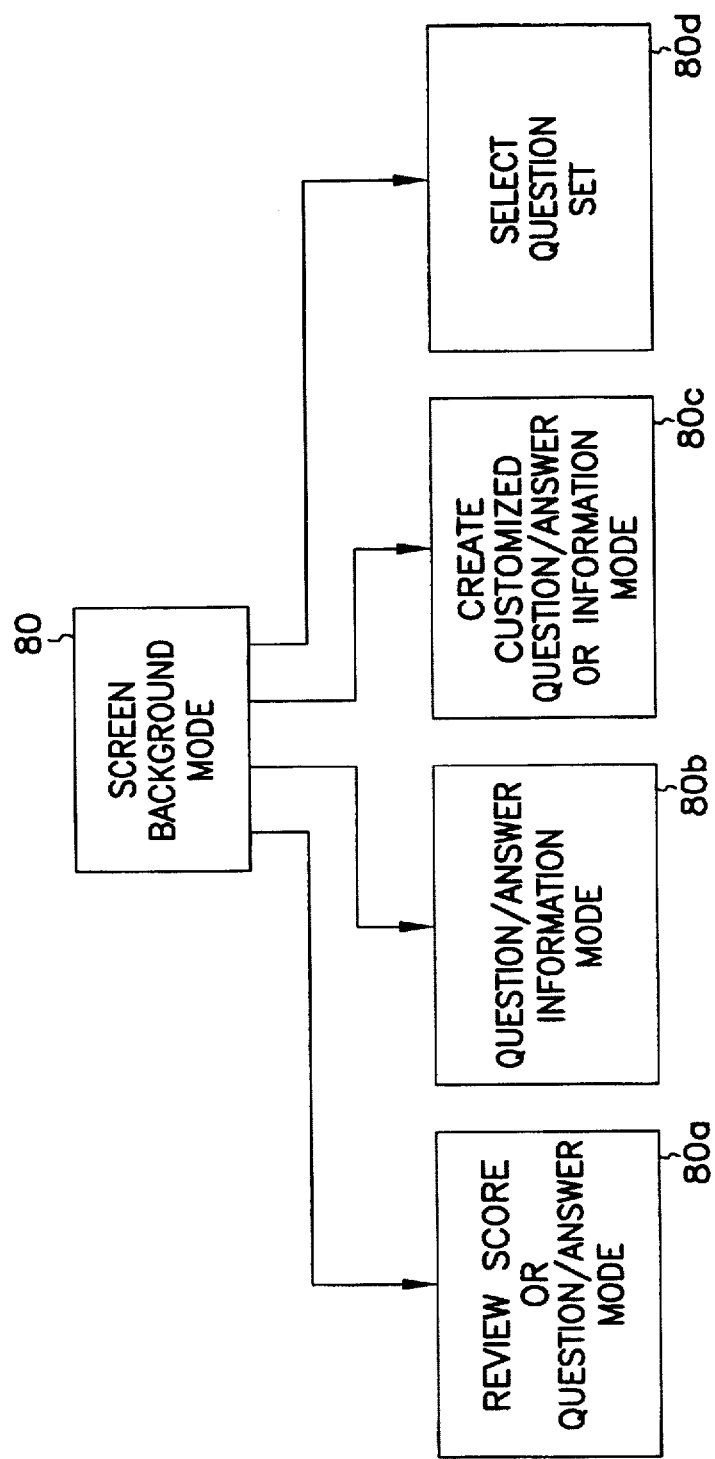
FIG. 8 is an overview of the software components of the screen saver program according to the present invention.

FIG. 8 illustrates the main components the screen saver program which provide the screen saver background mode 80 and the foreground modes 80a, 80b, 80c and 80d. These modes corresponding to the flow diagrams illustrated above.

Figure 9:
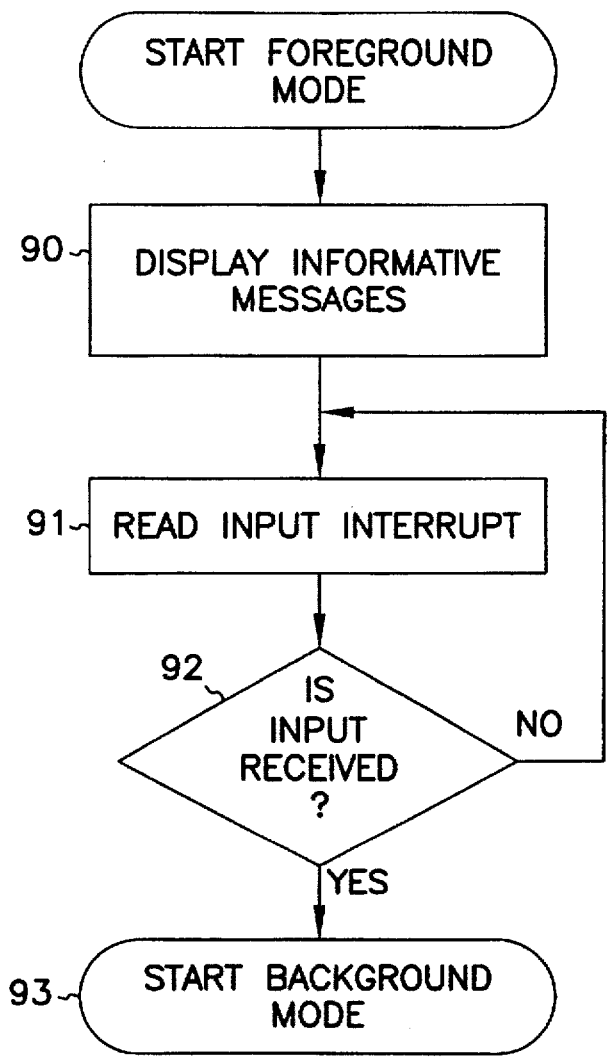
FIG. 9 shows an alternate embodiment of the software of the present invention.

Referring to FIG. 9, there is illustrated an alternate exemplary embodiment similar to that of FIG. 3, except that the step of displaying an answer is omitted, and only an "information unit" is displayed prior to returning to the background mode. This information unit may constitute any information, such as statement of a fact or a quote, that can be read by a user as informative. For example, facts about a given topic could be organized in sets and presented to a user as a learning tool.

Figure 10A:
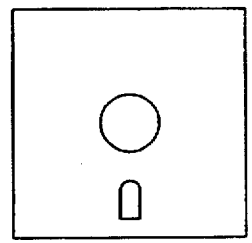
FIGS. 10A and 10B show a media containing a screen saver program according to the present invention.
Figure 10B:
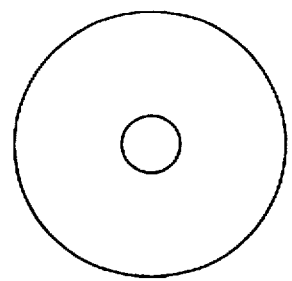

FIGS. 10A and 10B illustrate storage mediums (e.g. magnetic disk or CD-Rom, respectively,) on which the screen saver program, or selected portions thereof, may be stored. It shall also be understood that the screen saver program of the present invention is executed in system 10 in a conventional manner, including storage on the mass storage unit of the system 10 or any network it is connected to. As used herein, the term "electronic storage device" refers both to computer memory and magnetic or CD-ROM storage mediums, or equivalents.

Also, the information in a question or answer may take an audio or visual form, such as a language drill in a foreign language, or a "name that tune" or "name that movie" question in which the question or answer takes the form of sound or video or both. Answers in the form of verbal input could be processed by the system to see if they are correct, or correctly identify the right answer in a multiple choice question.

In addition, the present invention provides a method for disseminating educational materials in the form of one or more sets of questions and answers in electronic form stored on an electronic storage device, with the set or sets adapted to be read by a screen saver program. The set or sets can be shipped or transported to a customer on a physical storage medium, or transported electronically over a telephone or network connection.

Thus, the present invention provides an informative way to save a screen, and allows a user to customize their own database it they wish to drill themselves on a particular topic.

What is claimed is:

1. A screen saver computer program including a database of questions and answers, the screen saver computer program stored on a computer executing at least one other program which receives input from a user of the computer, a display device of the computer displaying one or more images generated by the computer under the control of the other program, wherein the computer activates the screen saver program to perform a question and answer session in the absence of user-generated input to the computer for a period of time, the period of time occurring while the images are displayed under the control of the other program, the activated screen saver program operation on the computer to generate one or more screen saver images displayed on the display device in place of all or a substantial portion of the images displayed under the control of the other program, wherein at least one or more of the screen saver images provide that a substantial portion of display elements of the screen display are rested or altered at least occasionally to save the display elements in the absence of input activity to the computer, and further operational to display a question from the database in one or more of the screen saver images, and to receive an answer responsive to the displayed question from a user of the computer entered through an input device of the computer, the activated screen saver program being deactivated so that control of the display is returned to the other program after the completion of the question and answer session so that the screen saver images are replaced with images generated under the control of the other program.

2. A screen saver program according to claim 1 further including a mode of operation on the computer for allowing a user to enter questions and answers into the database using an input device of the computer, so that a user can create a custom database.

3. A screen saver program according to claim 1 further including a mode of operation on the computer for allowing a user to review a score indicative of the number of correctly answered questions.

4. A screen saver program according to claim 1 further wherein at least one of the screen saver images is a picture or illustration which is the subject of one of the questions in the database.

* * * * *

UNITED STATES PATENT AND TRADEMARK OFFICE
CERTIFICATE OF CORRECTION

PATENT NO.    :   5,738,527
DATED         :   April 14, 1998
INVENTOR(S)   :   Steven W. Lundberg It is certified that error appears in the above-identified patent and that said Letters Patent is hereby corrected as shown below:

At Col. 4, line 37, please delete "operation on" and insert --operational on--.

Signed and Sealed this

Sixteenth Day of February, 1999

Attest:

Attesting Officer

Acting Commissioner of Patents and Trademarks